(12) United States Patent
Wang

(10) Patent No.: US 8,243,440 B2
(45) Date of Patent: Aug. 14, 2012

(54) FOLDABLE COMPUTING DEVICE WITH COUNTERBALANCE MEMBER

(75) Inventor: Tao Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/915,053

(22) Filed: Oct. 29, 2010

(65) Prior Publication Data
US 2012/0002369 A1    Jan. 5, 2012

(30) Foreign Application Priority Data
Jul. 5, 2010    (CN) .......................... 2010 1 0217664

(51) Int. Cl.
*H05K 5/00* (2006.01)
*H05K 7/00* (2006.01)

(52) U.S. Cl. ......... 361/679.55; 361/679.01; 361/679.21; 361/679.26; 361/679.34; 361/679.35; 361/679.36

(58) Field of Classification Search ............. 361/679.01, 361/679.21, 679.26, 679.34, 679.35, 679.36, 361/679.55
See application file for complete search history.

(56) References Cited

U.S. PATENT DOCUMENTS

| | | | |
|---|---|---|---|
| 6,744,629 B2 * | 6/2004 | Hidesawa | 361/679.48 |
| 7,320,526 B2 * | 1/2008 | Nickence et al. | 359/844 |
| 7,578,243 B2 * | 8/2009 | Gevaert | 108/25 |
| 7,819,247 B2 * | 10/2010 | Gonzalez | 206/320 |

* cited by examiner

*Primary Examiner* — Anthony Haughton
(74) *Attorney, Agent, or Firm* — Altis Law Group, Inc.

(57) ABSTRACT

A foldable computing device with counterbalance member includes a main body, a rotary member, and a shaft. The rotary member is rotatably connected to the main body by the shaft. The main body, from top to bottom, includes a top cover, a printed circuit board, a counterbalance member and a bottom case. The counterbalance is configured to maintain contact with the printed circuit board and the bottom case. Electrostatic charges produced on the printed circuit board can be conducted to the bottom case through the counterbalance member, and then to ground.

14 Claims, 3 Drawing Sheets

FOLDABLE COMPUTING DEVICE WITH COUNTERBALANCE MEMBER

BACKGROUND

1. Technical Field

The present disclosure relates to foldable computing devices and, more particularly, to a foldable computing device having a counterbalance member.

2. Description of Related Art

Generally, foldable electronic devices, such as notebook computers and DVD players, include a main body and a display rotatably connected to the main body by a shaft. If a user tips the display back too much (for example, 145 degrees or more), the device may tip over towards the display side.

It is desirable to provide a foldable computing device with a counterbalance member.

FIG. 3 is a partial, cutway view showing printed circuit board, a counterbalance member, and a bottom case staying in contact with each other.

BRIEF DESCRIPTION OF THE DRAWINGS

The components in the drawings are not necessarily drawn to scale, the emphasis instead being placed upon clearly illustrating the principles of the foldable computing device with a counterbalance member. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
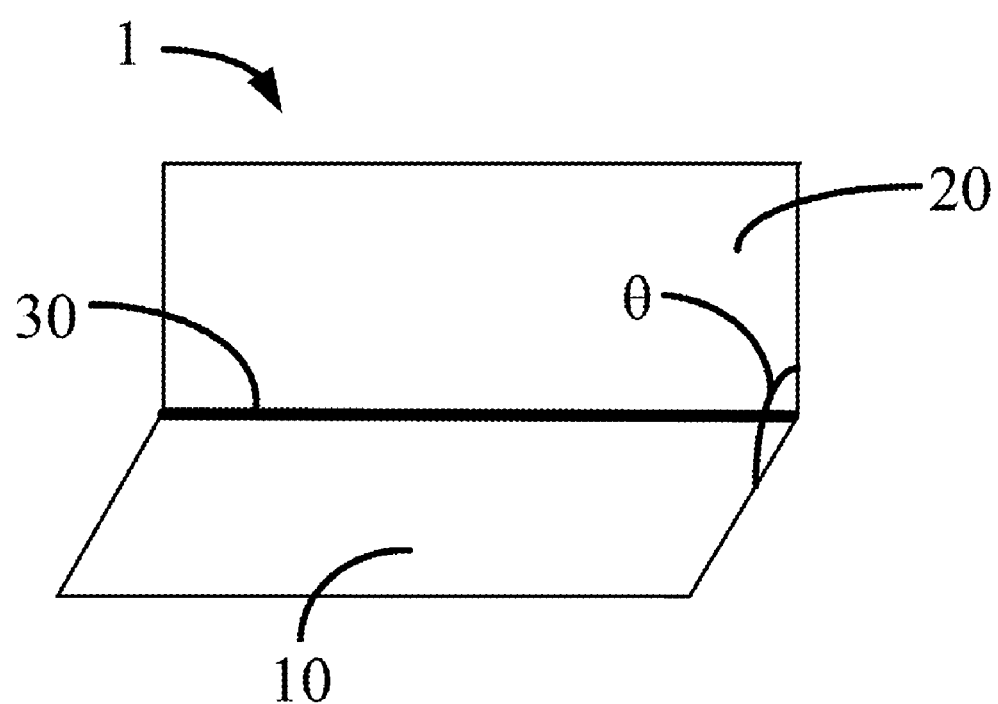
FIG. 1 is a schematic view of a foldable computing device with a counterbalance member in accordance with an exemplary embodiment.

Referring to FIG. 1, a foldable computing device 1 includes a main body 10, a rotary member 20, and a shaft 30. The rotary member 20 is rotatably connected to the main body 10 by the shaft 30. In the embodiment, the rotary member 20 is a display, and the device 1 is a notebook computer. In an alternate embodiment, the device 1 may be a DVD player, an electronic book, or other foldable device.

Figure 2:
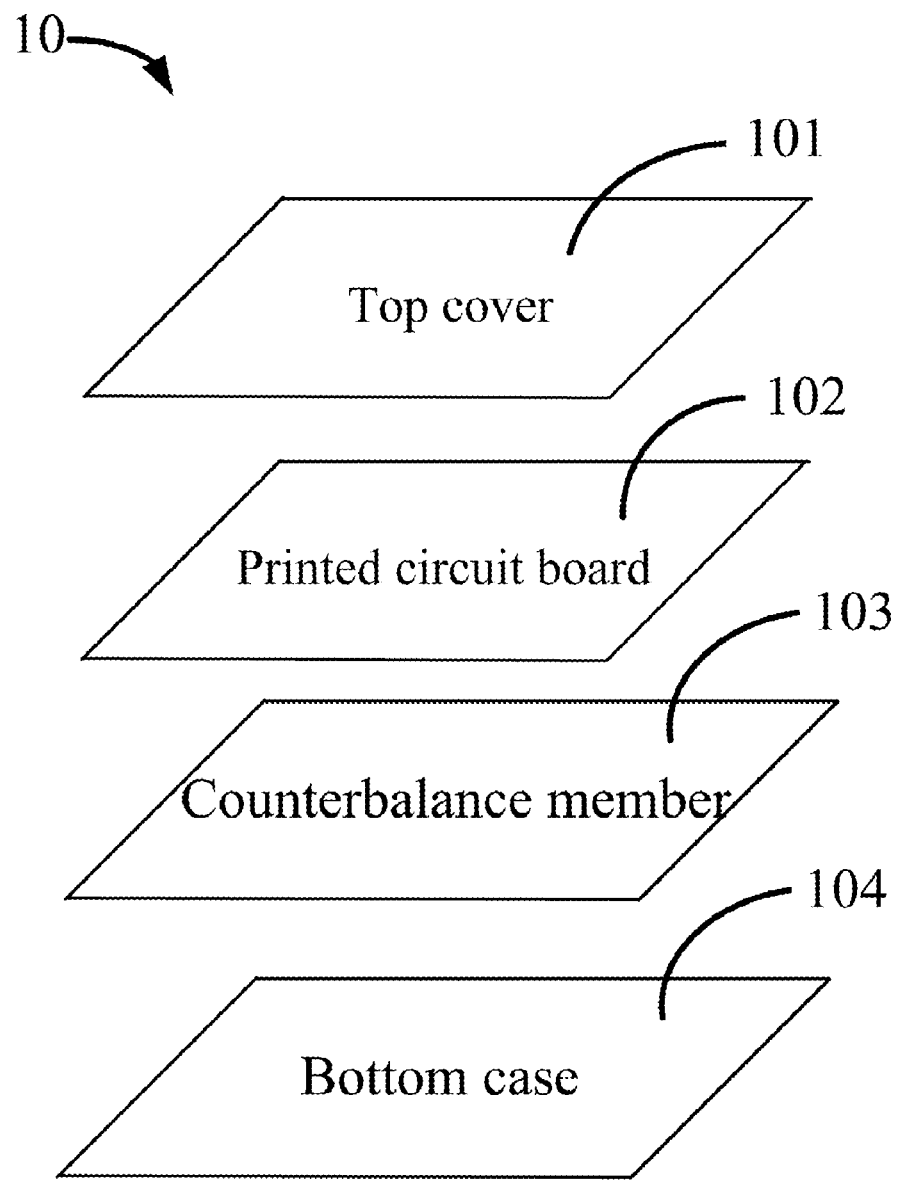
FIG. 2 is a schematic view showing the structure of a main body of the foldable computing device in FIG. 1.
Figure 3:
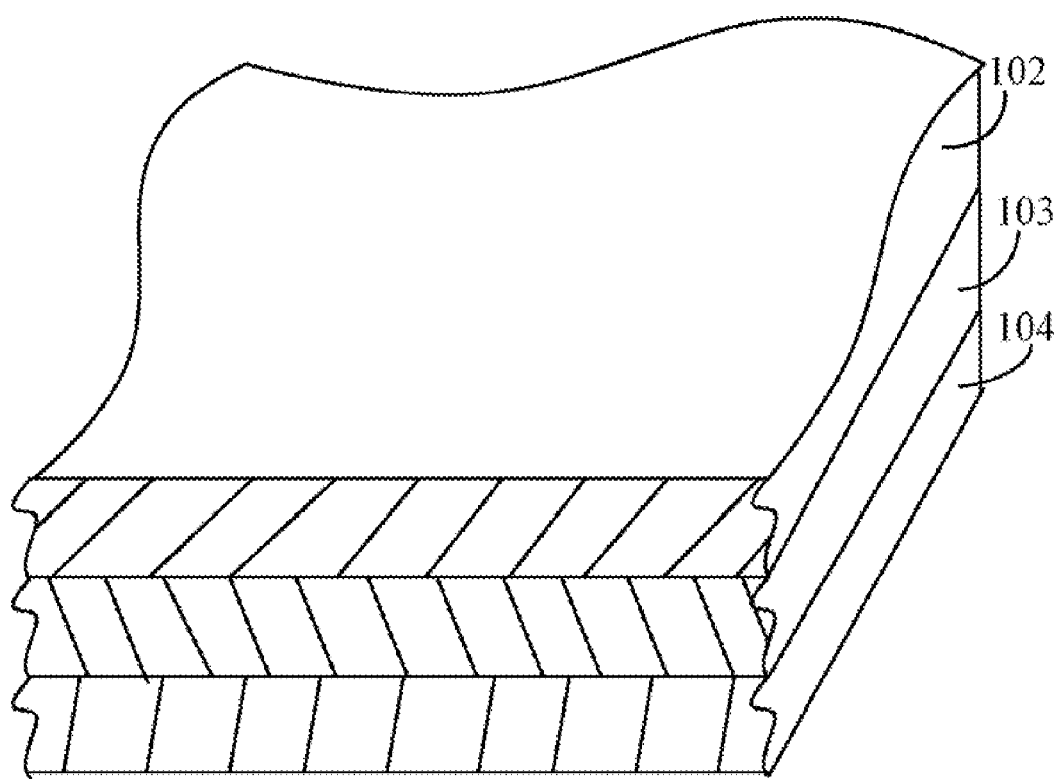
FIG. 3 is a partial, cutaway view showing a printed circuit board, a counterbalance member, and a bottom case staying in contact with each other.

Referring to FIG. 2, the main body 10 includes, from top to bottom, a top cover 101, a printed circuit board (PCB) 102, a counterbalance member 103, and a bottom case 104. The counterbalance member 103 has sheet like structure, is arranged between and stays in contact with the PCB 102 and the bottom case 104 (see FIG.3). The counterbalance member 103 can be made of material having excellent electrical conductivity, and can have substantially the same size as the PCB 102 in order to provide EMI shielding. In the embodiment, the counterbalance member 103 can be configured to have more of its weight distributed towards the front of the device 1 to better counteract tipping forces when the angle 0 between the rotary member 20 and the main body 10 is very large. The counterbalance member 103 can be made of iron, copper and the like and be more wedge-shaped with the thicker heavier part towards the front of the device 1. Additionally, the counterbalance member 103 can conduct electrostatic charges on the PCB 102 to the bottom case 104, and thus to ground. The electronic components on the PCB 102 are thus further protected.

Although the current disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A foldable computing device with counterbalance member comprising:
   a main body comprising:
      a top cover;
      a printed circuit board,
      a bottom case, and
      a counterbalance member arranged between and staying in physically contact with the printed circuit board and the bottom case;
   a shaft; and
   a rotary member rotatably connected to the main body by the shaft;
   wherein the counterbalance member is configured to have its weight distributed towards the front of the foldable computing device.

2. The foldable computing device according to claim 1, wherein the counterbalance member is made of material having electrical conductivity exceeding a preset value.

3. The foldable computing device according to claim 2, wherein the counterbalance member is made of iron or copper.

4. The foldable computing device according to claim 1, wherein the counterbalance member has substantially the same size as the printed circuit board.

5. The foldable computing device according to claim 1, wherein the rotary member is a display.

6. The foldable computing device according to claim 1 being a notebook computer, a DVD player, or an electronic book.

7. The foldable computing device according to claim 1, wherein the counterbalance member is capable of conducting electrostatic charges on the printed circuit board to the bottom case, and thus to ground.

8. A foldable computing device with counterbalance member comprising:
   a main body comprising:
      a top cover;
      a printed circuit board,
      a bottom case, and
      a counterbalance member arranged between and staying in physically contact with the printed circuit board and the bottom case;
   a shaft; and
   a rotary member rotatably connected to the main body by the shaft;
   wherein the counterbalance member is configured to conduct electrostatic charges on the printed circuit board to the bottom case, thereby achieving grounding.

9. The foldable computing device according to claim 8, wherein the counterbalance member is made of material having electrical conductivity exceeding a preset value.

10. The foldable computing device according to claim 9, wherein the counterbalance member is made of iron or copper.

11. The foldable computing device according to claim 8, wherein the counterbalance member has substantially the same size as the printed circuit board.

12. The foldable computing device according to claim 8, wherein the rotary member is a display.

13. The foldable computing device according to claim 8 being a notebook computer, a DVD player, or an electronic book.

14. The foldable computing device according to claim 8, wherein the counterbalance member is configured to have its weight distributed towards a front of the foldable computing device.

* * * * *